United States Patent [19]

Sheng

[11] 3,813,595

[45] May 28, 1974

[54] CURRENT SOURCE

[75] Inventor: Abel Ching Nam Sheng, Morris Plains, N.J.

[73] Assignee: RCA Corporation, New York, N.Y.

[22] Filed: Mar. 30, 1973

[21] Appl. No.: 346,672

[52] U.S. Cl. .................................. 323/4, 323/22 R

[51] Int. Cl. .......................................... G05f 5/00

[58] Field of Search ........ 307/296, 297, 304; 323/1, 323/4, 16, 19, 22 R

[56] References Cited

UNITED STATES PATENTS

| | | | |
|---|---|---|---|
| 3,444,397 | 5/1969 | Lym | 307/304 X |
| 3,508,084 | 4/1970 | Warner | 307/304 |
| 3,512,012 | 5/1970 | Kosowsky et al. | 307/304 X |

*Primary Examiner*—A. D. Pellinen

[57] ABSTRACT

An MOS field-effect transistor having its gate electrode connected to its drain electrode can be used to operate as a constant current device by means of a resistive network placed between its source and substrate electrodes.

16 Claims, 8 Drawing Figures

CURRENT SOURCE

The present invention relates to constant-current sources and particularly to constant-current sources of the type employing a metal-oxide-semiconductor field effect transistor.

The metal-oxide-semiconductor field-effect transistor will be referred to as a "MOSFET" in this application. A MOSFET is a voltage-amplifying device having an input circuit between the gate and source electrodes and an output circuit between its drain and aforesaid source electrodes. The MOSFET displays a transconductance between these input and output circuits which can be controlled by the application of potential between its source and substrate electrodes. In the prior art, this phenomenon has been used in applying automatic gain control to a MOSFET connected in a common-source amplifier configuration.

A circuit embodying the invention comprises a field-effect transistor, such as a MOSFET, connected drain-to-gate and including means providing a reverse bias between the source and substrate electrodes whose value is a function of the supply voltage value. In a preferred form of the invention, any change in the supply voltage value causes a non-linearly related change in the bias voltage value in a sense to tend to maintain the drain current of the transistor constant.

Figure 1:
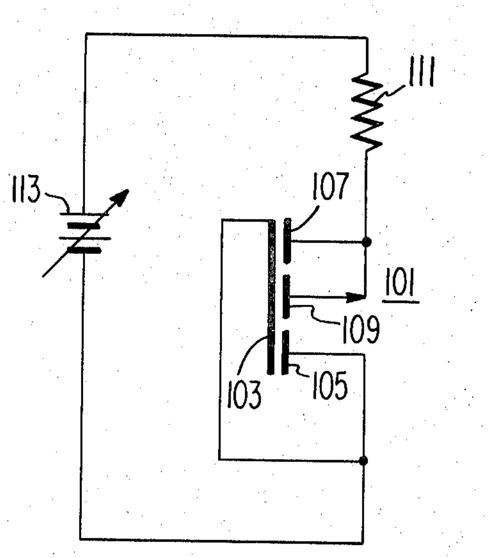
FIGS. 1 and 4 are each schematic diagrams of simple circuits useful in understanding the present invention.

FIG. 1 shows a simple circuit using a MOSFET 101 of the P-channel type with interconnected gate and drain electrodes, 103 and 105, respectively, which configuration shall be termed a "diode-connected" MOSFET. Its source and substrate electrodes, 107 and 109, respectively, are also interconnected. Diode-connected MOSFET's can be used as resistors, as is well-known, and can be used to provide those elements shown as resistors in the FIGURES. The source-to-drain path of MOSFET 101 is connected in serial combination with a resistor 111. A low-impedance supply 113 of adjustable or variable potential is impressed across this serial combination.

Figure 2:
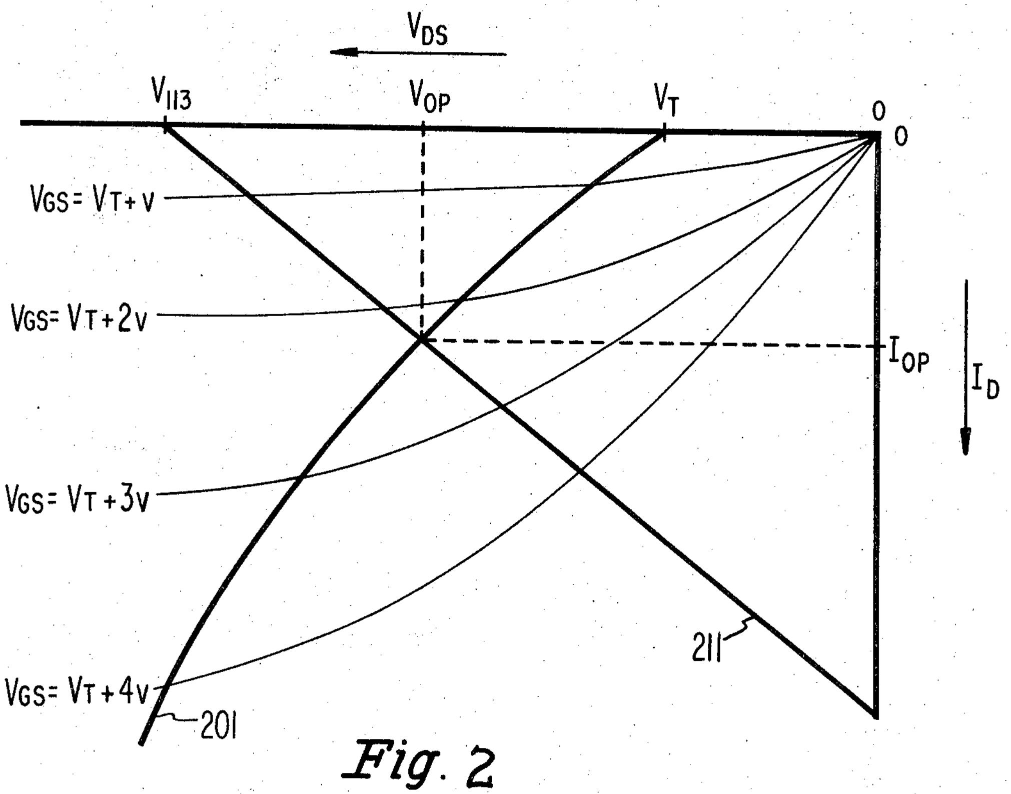
FIG. 2 is a drain current versus source-to-drain voltage characteristic of a MOSFET having the conduction characteristic of a diode-connected MOSFET.

FIG. 2 shows a family of drain current ($I_D$) versus source-to-drain voltage ($V_{DS}$) curves, each for a different value of source-to-gate voltage ($V_{GS}$), which characterize the operation of a typical p-channel MOSFET having equal source and substrate potentials. These characteristic curves conform quite closely to the well known equation, which describes the operation of a MOSFET.

$$I_D = K\,(V_{GS} - V_T)^2, \qquad (1)$$

where:

$I_D$ is drain current, $V_{GS}$ is source-to-gate potential, $V_T$ is a threshold potential, which must be exceeded before the MOSFET becomes conductive, and $K$ is a conductivity constant proportional to the surface mobility of carriers in the channel of the MOSFET, to the width of the channel and to the permittivity of the oxide layer overlying the channel and inversely proportional to the thickness of the oxide layer and to the length of the channel.

The conduction characteristic of the drain-to-source path of the MOSFET 101 of FIG. 1 with its interconnected gate and drain electrodes is given by a locus 201 of points where $V_{GS} = V_{DS}$. The conductivity of this path for the diode-connected MOSFET is equal to its transconductance for $V_{GS}$. The conductivity of the path is $I_D/V_{DS}$. When $V_{DS}$ equals $V_{GS}$, its conductivity is equal to $I_D/V_{GS}$ which is the definition of transconductance.

For any value of potential $V_{113}$ is provided by supply 113, a load line 211 corresponding to the conduction characteristic of resistor 111 can be plotted against the conduction characteristic 201 of the diode-connected MOSFET 101. That is, the actual $V_{DS}$ appearing between the source and drain electrodes of MOSFET 101 will be lower than the supply potential $V_{113}$ by the potential drop $I_D R_{111}$ across resistor 111, where $R_{111}$ is the resistance of resistor 111. (The biasing of the gate electrode 103 is such that it is possible in the circuit of FIG. 1 for resistor 111 to be considered a drain resistor rather than a source resistor for purposes of analysis). The intersection of conduction characteristic 201 of MOSFET 101 and load line characteristic 211 of resistor 111 determines the operating point of MOSFET 101. MOSFET 101 will have $V_{DS}$ and $I_D$ of $V_{OP}$ and $I_{OP}$, respectively; and resistor 111 will have a potential drop thereacross of $V_{113} - V_{OP}$ and a current therethrough of $I_{OP}$.

Figure 3:
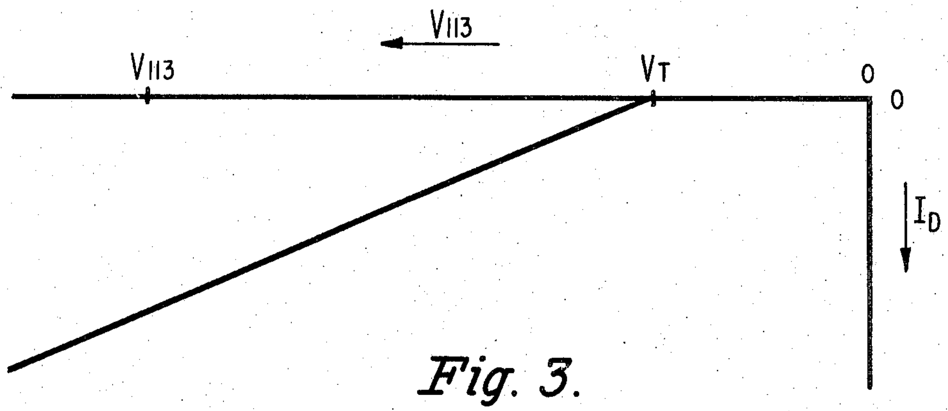
FIG. 3 is a plot derived from the FIG. 2 characteristic useful in describing the problem which the present invention solves.

This graphical analysis technique may be repeated for a number of different potentials $V_{113}$ of supply 113. Then, the operating current $I_{OP}$ of the MOSFET 101 for each value of $V_{113}$ may be plotted against that corresponding value of $V_{113}$, as shown in FIG. 3. The operating current $I_{OP}$ will be seen to rise as the supply voltage $V_{113}$ is increased. To operate MOSFET 101 as a constant current device it is necessary to counteract this rise over the range of $V_{113}$ expected to be encountered.

If one wished to keep constant current in the series combination of MOSFET 101 and resistor 111, the resistance of this series combination must increase proportionally with $V_{113}$ over this range. That is, the conductivity of the drain-to-source path of MOSFET 101 must decrease with increasing $V_{113}$ in this range of $V_{113}$, rather than increasing per curve 201 of FIG. 2. Since the conductivity of this path is equal to the transconductance of MOSFET 101 for $V_{GS}$, it follows that this transconductance must decrease appropriately with increasing $V_{113}$.

It is known that the transconductance for $V_{GS}$ of a MOSFET can be decreased by application of a reverse biasing potential between its source and substrate electrodes. This phenomenon conventionally is described in terms of the threshold voltage $V_T$ being, in effect, altered from its value $V_{TO}$ when the source and substrate potentials are equal. The following equation describes the relationship of this altered $V_T$ with respect to $V_{TO}$.

$$V_T = V_{TO} + K_B\,[(-V_B-0.8)^{1/2}-(0.8)^{1/2}], \tag{2}$$

where:

$K_B$ is a dimensionless constant, and $V_B$ is the reverse bias potential applied between the source and substrate potentials.

This equation can be cross-solved with equation 1 to obtain a rather complex equation describing $V_B$ in terms of $V_{GS}$ and $I_D$. $V_{GS}$ can be expressed in terms of $V_{113}$ minus the potential drop $I_D\,R_{111}$ across resistor 111, and by substitution of $V_{GS}$ in terms of $I_D$ into the previous equation the following equation will be obtained.

$$V_B = -0.8 - \frac{(V_{113} - I_D R_{111} - V_{T0} - \sqrt{0.8}K_B - \sqrt{I_D/K})^2}{K_B} \tag{3}$$

To obtain substantially constant $I_D$, $V_B$ must increase at a more than linear rate with increasing $V_{113}$. However, even a linear increase of $V_B$ with $V_{113}$ will provide a more constant $I_D$ than would otherwise be obtained.

In practice, it is simpler to perform electrical measurements on several MOSFET devices of the type one plans to use, connecting them as diodes and measuring the $V_B$'s necessary to maintain $I_D$ constant at a variety of current levels when $V_{GS}$ is varied over the range of interest. In any case, the present invention is primarily concerned with reducing the conductivity of the drain-to-source path of a diode-connected MOSFET transistor by increasing the potential between its source and substrate electrodes at the same time its $V_{GS}$ and $V_{DS}$ are increased, thereby to maintain its $I_D$ more constant despite the changes in its $V_{GS}$ and $V_{DS}$.

Figure 4:
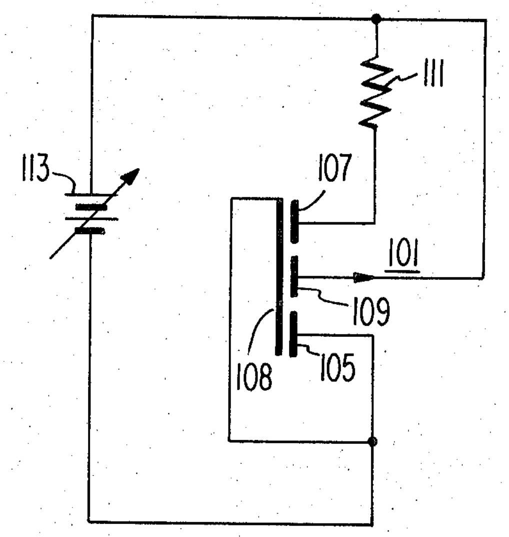

The circuit of FIG. 4 is a configuration in which $I_D$ is considerably more constant than in the configuration of FIG. 1. The substrate and source electrodes of MOSFET 101 are not connected together as in the FIG. 4 circuit but rather to opposite ends of resistor 111. The drain current $I_D$ flowing through the drain-to-source path of MOSFET 101 develops a potential drop $V_{111}$ across resistor 111 which places a reverse bias potential between the substrate and source electrodes, reducing the conductivity of the source-to-drain path. As $I_D$ tends to increase, the reverse bias potential $V_{111}$ developed across resistor 111 in response to $I_D$ also tends to increase. This tends to reduce the conductivity of the source-to-drain path of MOSFET 101 and so counteracts the tendency towards increased $I_D$. As $I_D$ tends to decrease, $V_{111}$ also tends to decrease. This tends to increase the conductivity of the source-to-drain path of MOSFET 101 and so counteracts the tendency toward reduced $I_D$.

This feedback mechanism is insufficient under practical circumstances to provide for as constant an $I_D$ as one would wish. Assuming $I_D$ were constant, the $V_B$ potential developed across resistor 111 would tend to increase linearly with increasing $V_{113}$. The quadratic function of $V_B$ with $V_{113}$ which is known from equation 3 to be desirable must be approximated with only this more linear function of $V_B$ with $V_{113}$. The approximation is acceptably good only if the potential $V_{111}$ appearing across resistor 111 and being much larger that the $V_{DS}$ of MOSFET 101. In most practical circuits, $V_{113}$ is constrained to be not much larger than $V_{DS}$, however.

Figure 5:
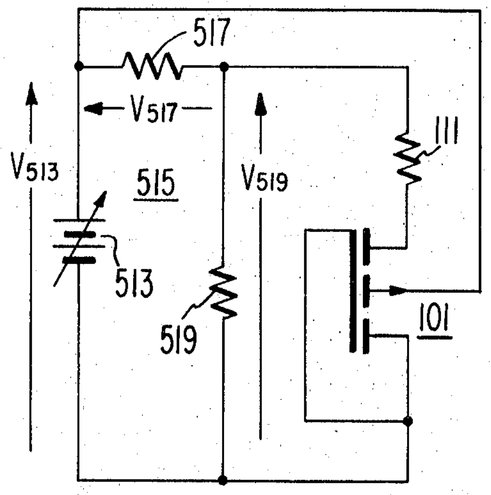
FIG. 5 is a schematic diagram of a MOSFET connected according to the present invention such that its drain current can be maintained substantially constant.

The inventor perceived that if a $V_B$ variation with $V_{113}$ could be provided which was larger than that developed by the potential drop $V_{111}$ alone, the desired quadratic function of $V_b$ could be better approximated in circuits where $V_{113}$ was constrained to be not much larger than $V_{DS}$. FIG. 5 shows a circuit in which MOSFET 101 is provided with a larger $V_B$ than that provided by just the potential drop $V_{111}$ developed across resistive element 111.

The supply 513 provides a potential $V_{513}$. the potential $V_{513}$ is applied to a potential divider 515, comprising serially connected resistors 517 and 519. $V_{519}$ is provided by the potential drop across resistor 519, which resistor in most designs will be of larger resistance than resistor 517. For purposes of analysis, it is simplest to assume that the resistance of resistor 111 is much larger than the resistance offered by the paralleled resistors 517, 519—that is, much larger than the source impedance of the potential divider 515.

As $V_{513}$ increases, $V_{517}$ and $V_{519}$ increase in proportion therewith. $V_{519}$ acts upon the circuit of FIG. 5 in substantially the same manner as $V_{113}$ in the circuit of FIG. 4. As $V_{519}$ increases, there is a propensity for $I_D$ of MOSFET 101 to increase. This propensity is counteracted by the increased voltage drop $V_{111}$ across the source resistor 111, as discussed in connection with the FIG. 4 circuit.

In addition, it is counteracted by the increased $V_{517}$ developed by the potential divider 515 and applied in sum with $V_{111}$ between the source and substrate electrodes of MOSFET 101. The $V_B$ potential, $V_{111} + V_{517}$, increases at a faster rate with increasing $V_{519}$ than the $V_B$ potential, $V_{111}$, did with increasing $V_{113}$ in the FIG. 4 circuit. This permits a better approximation to the desired $V_B$ versus $V_{113}$ characteristic described in equation 3 when the available supply potential $V_{513}$ cannot greatly exceed $V_{DS}$-for instance, because of practical limitations on the resistance of resistor 111.

The resistive network provided by resistors 111, 517 and 519 also provides source electrode degeneration which stabilizes MOSFET 101 against $I_D$ variation arising from change of its $V_T$ with temperature. In many practical designs, it is possible to subsume at least part of the function of resistor 111 into the functioning of resistors 517 and 519 by making the resistance of resistor 111 lower than assumed and the resistances of resistors 517 and 519 higher than assumed, relatively speaking.

Figure 6:
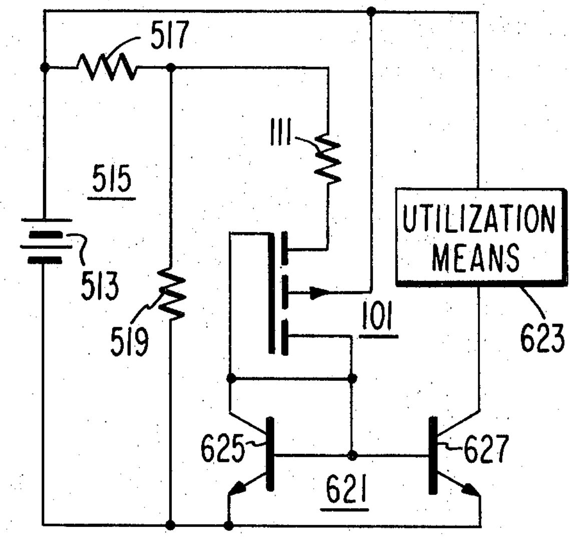
FIGS. 6, 7 and 8 are schematic diagrams of constant current sources embodying the present invention.
Figure 7:
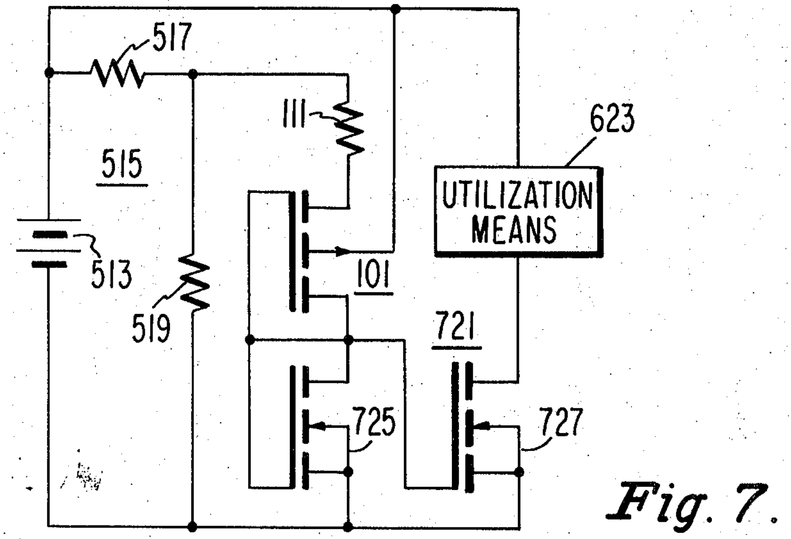
Figure 8:
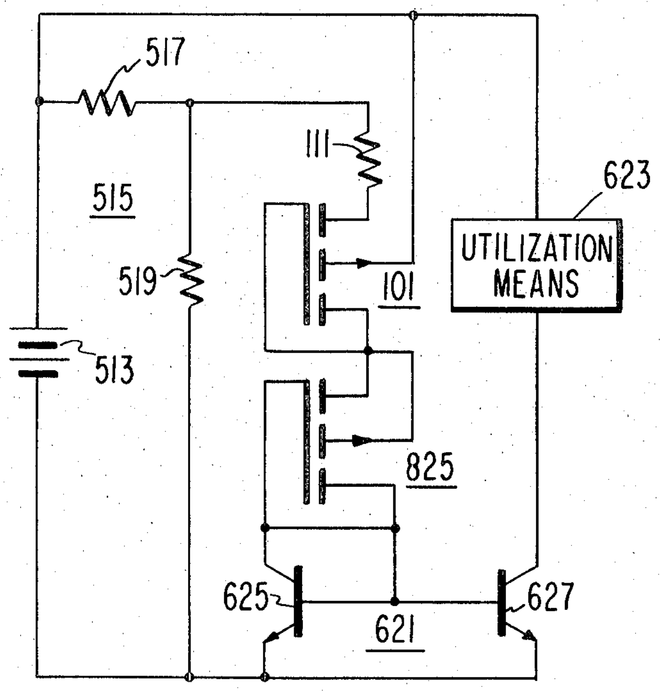

The addition of the $V_{517}$ potential component to the $V_B$ potential reverse-biasing the substrate electrode of MOSFET 101 with respect to its source electrode substantially reduces its transconductance for $V_{GS}$. This makes the drain current $I_D$ of that device relatively small for the given values of $R_{111}$ and $V_{519}$ as compared with the FIG. 4 configuration using like values of $R_{111}$ and $V_{113}$. The FIG. 5 configuration thus provides a fundamental building block for use in low current, constant current supply circuits. In such circuits, the current flow through the drain-to-source path of MOSFET 101 is sensed in means providing an output current proportional to the sensed current flow. FIGS. 6, 7 and 8 each also shows such a current supply. Each uses a current amplifier which is used to sense the drain current of the MOSFET 101 and the output circuit of which is used to supply current to utilization means.

In FIG. 6 the current amplifier 621 supplying current to utilizing means 623 is one of the "current mirror" configurations commonly used with NPN bipolar transistors. Its input circuit has a high input conductance equal to the transconductance of its input transistor 625 at the $I_D$ of MOSFET 101. Because of its collector-to-base negative feedback connection, transistor 625 maintains a small offset potential of 500 to 700 millivolts between (1) the interconnection of its base and collector electrodes and (2) its emitter electrode. The operation of MOSFET 101 is little affected by this offset potential. The base-emitter potential of transistor 627 being the same as that of transistor 625, the current density in its base-emitter junction is the same as that in the base-emitter junction of transistor 625. The collector current drawn by transistor 627 from utilization means 623 will therefore be proportional to $I_D$ flowing as collector current to transistor 625 (presuming the base currents of transistors 625 and 627 to be negligibly small as compared to their collector currents).

The FIG. 6 circuit and other such circuits using different types of NPN transistor "current mirror" configurations are of particular use in the PMOS-bipolar integrated circuit technology, which predominately uses P-channel Mosfet's and NPN bipolar transistors. All such circuits using known types of NPN bipolar transistor "current mirror" configurations are to be considered within the scope of claims of the present application. Also, such configurations wherein n-channel MOSFET's and PNP bipolar transistors replace p-channel MOSFET's and NPN bipolar transistors are to be considered within the scope of claims of the present application.

Referring to FIG. 7, current amplifier 721 employing n-channel MOSFET's 725 and 727 replaces the current amplifier 621 of FIG. 6. The embodiment of the present invention shown in FIG. 7 is useful in COSMOS (COmplementary Symmetry Metal-Oxide Semiconductor) technology, and alternatively may be realized using p-channel MOSFET's instead of n-channel MOSFET's and n-channel MOSFET's instead of p-channel MOSFET's also.

The offset potential between the interconnection of the drain and gate electrodes of MOSFET 725 and the interconnection of its source and substrate electrodes will necessarily be larger than its threshold potential ($V_T$), and therefore will usually be at least 3 or 4 volts in magnitude. This offset potential must be subtracted from $V_{519}$ when claculating the effective supply potential of MOSFET 101. In an analysis similar to that using the plot of FIG. 2, the conduction characteristic of the drain-to-source path of the diode-connected MOSFET 725 must be combined as for a series circuit with that of resistor 111 in determining the load-line for MOSFET 101. The square law characteristic of the resistance provided by the diode-connected MOSFET 725 augments the function of resistor 111 in developing a more constant drain current in MOSFET 101 as $V_{513}$ varies and does so better than a linear resistive element in the drain current could do.

FIG. 8 shows a variation of the FIG. 6 circuit in which a similar augmentation function is provided by diode-connected MOSFET 825, to connect the drain electrodes of MOSFET 101 to the input circuit of current amplifier 621. It is also possible to obtain a similar augmentation function in the FIG. 6 configuration by using a diode-connected MOSFET similar to 825 of FIG. 8 for resistive element 111 instead of a resistor of fixed resistance.

What is claimed is:

1. A current source comprising:

a field effect transistor having a drain, a source, a gate and a substrate electrodes, the gate electrode thereof being direct coupled to the drain electrode thereof;

a resistive element having first and second ends direct coupled to the substrate and source electrodes of said field-effect transistors, respectively;

means for coupling operating and reference potentials to separate ones of the substrate and drain electrodes of said field-effect transistor;

means for sensing the drain current of said field-effect transistor flowing in response to said operating potential and for responding to the sensed said drain current to provide an output current; and means for utilizing said output current.

2. A current source as claimed in claim 1 wherein:

a potential divider included in said means for coupling potentials receives said operating and reference potentials and supplies a potential intermediate therebetween to the first end of said resistive element, and said resistive element has its second end directly connected to said field effect transistor source electrode.

3. A current source as claimed in claim 1 wherein said means for sensing the drain current of said field-effect transistor flowing in response to said operating potential and for responding to the sensed said drain current to provide an output current comprises:

a first and a second semiconductor amplifier devices having common electrodes each connected to receive said reference potential, having output electrodes respectively coupled to said field-effect transistor drain electrode and to said utilizing means, and having input electrodes coupled from said first amplifier device output electrode.

4. A current source as claimed in claim 1 wherein said means for sensing the drain current of said field-effect transistor flowing in response to said operating potential and for responding to the sensed said drain current to provide an output current comprises:

a first and a second bipolar transistors having emitter electrodes each connected to receive said reference potential, having collector electrodes respectively coupled to said field-effect transistor drain electrode and to said utilizing means, and having base electrodes coupled from said first transistor collector electrode.

5. A current source as claimed in claim 4 wherein:

a further field-effect transistor has a drain and a source electrodes with a path therebetween providing said coupling between said field effect transistor drain electrode and said first bipolar transistor collector electrode, has a gate electrode coupled from its said drain electrode and has a substrate electrode coupled to its said source electrode.

6. A current source comprising:

means for supplying operating and reference potentials;

a field effect transistor having a drain and a source electrodes and a drain-to-source path therebetween, having a gate electrode coupled from its said drain electrode, and having a substrate electrode coupled to its said source electrode,
a first and a second bipolar transistor devices having emitter electrodes each connected to receive said reference potential, having collector electrodes and having base electrodes each coupled from said first transistor collector electrode;
means for coupling said first transistor collector electrode to receive said operating potential including said drain-to-source path of said field effect transistor; and
utilization means connected to said second transistor collector electrode and adapted for the collector current flow of said second transistor therethrough.

7. A current source comprising:
a first and a second terminals for application of separate ones of an operating and a reference potentials, respectively,
a first field effect transistor formed on a substrate and having a drain, a source, a gate, and a substrate electrodes, the gate electrode thereof being direct coupled to the drain electrode thereof, the substrate electrode thereof being connected to said first terminal;
a first and a second resistive elements being serially coupled between said first and said second terminals and having an interconnection between them;
means direct current conductively coupling said first field effect transistor source electrode to said interconnection; and
current amplifier means having an input circuit connecting said first field effect transistor drain electrode to said second terminal and having an output circuit from which output current is provided.

8. A current source as claimed in claim 7 wherein:
a third resistive element is included in said means direct current conductively coupling said first field effect transistor source electrode to said interconnection.

9. A current source as claimed in claim 7 wherein:
said current amplifier comprises:
an output terminal and
a second and a third field effect transistors of complementary conductivity type to that of said first field effect transistor, each having a source and a substrate electrodes connected to said second terminal, having drain electrodes respectively coupled to said first field effect transistor drain electrode and to said output terminal and each having gate electrodes coupled from said second field effect transistor drain electrode.

10. A current source as claimed in claim 7 wherein said current amplifier comprises:
an output terminal and
a first and a second bipolar transistors each having an emitter electrode connected to said second terminal, having collector electrodes respectively coupled to said first field effect transistor drain electrode and to said output terminal and each having a base electrode coupled from said first bipolar transistor collector electrode.

11. In combination:
a field effect transistor having source, drain, gate and substrate electrodes, connected gate-to-drain;
voltage supply terminals coupled to said source and drain electrodes, respectively, for supplying an operating voltage to said transistor; and
biasing means coupled between said source and substrate electrodes and responsive to said operating voltage for supplying a reverse bias voltage between said source and substrate electrode which varies with variations in said operating voltage at a rate and in a sense to tend to maintain constant the source-to-drain current of said transistor.

12. The combination of claim 11 wherein said biasing means includes:
means for providing a potential proportional to and smaller than said operating potential and
means for coupling said proportional potential between said source and said substrate electrodes.

13. The combination of claim 12 wherein said means for coupling said proportional potential between said source and said substrate electrodes includes:
a resistive element coupling said source electrode to said means for providing a potential proportional to and smaller than said operating potential.

14. The combination of claim 11 wherein said biasing means comprises:
a potential divider having an input circuit connected between said voltage supply terminals, a first output circuit direct coupled between said substrate and said source electrodes, and a second output circuit direct coupled between said source and said drain electrodes.

15. The combination of claim 14 wherein said potential divider further includes a common connection between its said first and said second output circuits and a resistive element links said common connection to said substrate electrode.

16. The combination of claim 15 wherein said resistive element comprises a diode connected further field-effect transistor.

* * * * *